United States Patent [19]

Baleanu

[11] Patent Number: 5,748,508

[45] Date of Patent: May 5, 1998

[54] METHOD AND DEVICE FOR SIGNAL ANALYSIS, PROCESS IDENTIFICATION AND MONITORING OF A TECHNICAL PROCESS

[76] Inventor: Michael-Alin Baleanu, Romerhofweg 47, D-85748 Garching, Germany

[21] Appl. No.: 494,594

[22] Filed: Jun. 23, 1995

Related U.S. Application Data

[63] Continuation-in-part of PCT/EP93/03674, Dec. 23, 1993.

[30] Foreign Application Priority Data

Dec. 23, 1992 [DE] Germany .............. 42 43 882.9

[51] Int. Cl.$^6$ .............. G05B 13/04; G06F 17/15
[52] U.S. Cl. .............. 364/578; 364/481; 364/151; 364/571.02; 395/3
[58] Field of Search .............. 364/578, 554, 364/571.02, 721, 724.17, 736, 481, 151; 395/2.09, 3

[56] References Cited

U.S. PATENT DOCUMENTS

| | | | |
|---|---|---|---|
| 4,435,770 | 3/1984 | Shiohata et al. | 364/508 |
| 4,730,257 | 3/1988 | Szeto | 364/484 |
| 4,901,244 | 2/1990 | Szeto | 364/481 |
| 5,099,436 | 3/1992 | McCown et al. | 364/550 |
| 5,237,642 | 8/1993 | Carayannis et al. | 395/2.09 |
| 5,249,257 | 9/1993 | Akahori et al. | 395/3 |
| 5,257,206 | 10/1993 | Hanson | 364/502 |
| 5,408,405 | 4/1995 | Mozumder et al. | 364/151 |
| 5,459,677 | 10/1995 | Kowalski et al. | 364/571.02 |
| 5,519,647 | 5/1996 | De Ville | 364/721 |
| 5,568,400 | 10/1996 | Stark et al. | 364/498 |

FOREIGN PATENT DOCUMENTS

| | | |
|---|---|---|
| 3133222 | 8/1981 | Germany . |
| 3725123 | 7/1987 | Germany . |
| 3805304 | 2/1988 | Germany . |

OTHER PUBLICATIONS

Zoubir, "Backward Elimination Procedures for Testing Multiple Hypotheses: Application to Optimal Sensor Location", ICASSP '94: Acoustics, Speech & Signal Processing, vol. 4, pp. 565–568 (IEEE Publication).

Zoubir, "Backward Elimination and Stepwise Regression Procedures for Testing Sensor Irrelevancy", Signals, Systems, & Computers, 1993 27th Asilomar Conf., pp. 538–542.

(List continued on next page.)

*Primary Examiner*—Kevin J. Teska
*Assistant Examiner*—Tyrone V. Walker
*Attorney, Agent, or Firm*—Weingarten, Schurgin, Gagnebin & Hayes LLP

[57] ABSTRACT

Method and device for modelling the variables relevant to a process as a function of other parameters describing or influencing the process, termed regressors, by means of multiple regression for the purpose of process identification, monitoring, analysis and control or regulation. The classical method of stepwise multiple regression is expanded by the introduction of the so-called collinearity cone into a recursive method yielding all "best" collinearity-free regression models. The method is completed by giving consideration to the regression errors and by restriction to the absolutely necessary matrix elements. Stable regression models of various sizes are thus produced with little expenditure of time. Further, either linear or nonlinear regression functions permit a more accurate process analysis or modelling. By automatic learning in the case of newly occurring combinations of regressive values, it is also possible to apply the process to process monitoring, control and regulation.

10 Claims, 6 Drawing Sheets

OTHER PUBLICATIONS

Berk, Kenneth N., Tolerance and Condition in Regression Computations, Journal of the American Statistical Association, Dec. 1977, vol. 72, No. 360, pp. 863–866.

Box, G.E.P., Use and Abuse of Regression, Technometrics, vol. 8, No. 4, pp. 625–629, Nov. 1966Bunke H., O.

Bunke, Ed., Nonlinear Regression, Functional Relations and Robust Methods, vol. II, Ch. 3, John Wiley & Sons.

→ Chatterjee Samprit, Glenn Heller, The Num. Effect of Measurement Error in the Explanatory Variables on the observed Least Squares Estimate, SIAM J. Matrix Anal. Appl., vol. 14, No. 3, pp. 677–687, Jul. 1993.

Cherkassky V. et al., Self–Organizing Network for Regression: Efficient Implementation and comparative evaluation, International Joint Conference on Neural Networks, IEEE Press New York Bd. 1, Jul. 1991, Seattle, pp. 79–84.

Draper N.R., H. Smith, Applied regression analysis, John Wiley & Sons 1981, ch. 6 (includes pp. 344–349).

Draper N.R., H. Smith, Applied regression analysis, John Wiley & Sons 1981, ch. 8.

Draper N.R., H. Smith, Applied regression analysis, John Wiley & Sons 1981, ch. 10.

Drobniak S., W. Elsner, The Multiregression Identification Algorithm for the Condition Monitoring of Turbomachinery, 8th International IMEKO Symposium on Technical Diagnostics, Sep. 23–25, 1992, Dresden, pp. 319–328.

Efroymson M.A., Mehrfache Regressionsanalyse, ch. 17 in A. Ralston, H.S. Wilf, Ed., Mathematische Methoden fur Digitalrechner, R. Oldenbourg Verlag 1967, pp. 345–362.

→ Farrar Donald E., Robert R. Glauber, Multicollinearity in Regression Analysis: The problem revisited, Review of Economics and Statistics, vol. 49 (1967), pp. 92–107.

Frane James W., A Note on Checking Tolerance in Matrix Inversion and Regression, Technometrics, vol. 19, No. 4, Nov. 1977, pp. 513–514.

Hocking R.R., The Analysis and Selection of Variables in Linear Regression, Biometrics 32, pp. 1–49, Mar 1976.

Krzyak Adam, Global convergence of the Recursive Kernel Regression Estimates with Applications in Classification and Nonlinear System Estimation, IEEE Transactions on Information Theory, Bd. 38, Nr. 4, Jul. 1992, New York.

→ Mandel John, The Regression Analysis of Collinear Data, Journal of Research of the National Bureau of Standards, vol. 90, Nr. 6, Nov.–Dec. 1985.

→ Mason Robert, L., R.F. Gunst, J.T. Webster, Regression analysis and problems of multicollinearity, Communications in Statistics, 4(3), (1975), pp. 277–292.

Mullet Gary, M., Why Regression Coefficients Have the Wrong Sign, Journal of Quality Technology, vol. 8, No. 3, pp. 121–126, Jul. 1976.

→ Newton R.G., D.J. Spurrell, A Development of Multiple Regression for the Analysis of Routine Data, Applied Statistics, 16, 1976, pp. 51–65.

Pawlak M. et al., On non–parametric estimation of a cascade nonlinear system by the kernel regression estimate, Proceedings of the 1991 IEEE International Symposium on Information Theory, IEEE Press New York, Jun. 1991, Budapest.

Schneeweiss H., H.–J. Mittag, Lineare Modelle mit fehlerbehafteten Daten, Physica–Verlag Heidelberg Wien, 1986.

Seitz, M., A. Kunz, H. Tolle, Lernende Regelung von Totzeitprozessen, Automatisierungstechnik 41, vol. 9, pp. 323–331, 1993.

Shannon, CO. Clare, IRL, A PC Program to aid in the choice of the design matrix in multiple linear regression, Int. Journal of Biomedical Computing, Elsevier Scientific Publishers, Bd. 33, Nr. 1, Jul. 1993, pp. 1–23.

→ Snee Ronald D., Some Aspects of Nonorthogonal Data Analysis, Part I. Developing Prediction Equations, Journal of Quality Technology, vol. 5, No. 2, Apr. 1973.

Spanias, A. et al., Block Time and Frequency Domain Modified Covariance Algorithms, Proceedings of ICASSP 92, IEEE Press New York, Bd. 5 März 1992, San Francisco, pp. 529–532.

Suoranta Risto et al., Utilizing Multivariate Autoregressive Model to reveal internal dependencies in Multichannel Measurement Data, Proceedings of IEEE Conference on Instrumentation and Measurement Technology, May 1991, Atlanta pp. 315–318.

Weigel Manfred, J. Boetius, Rechnergestützte schwingungsdiagnostische Überwachung von Kraftwerksturbosätzen, VDI–Berichte Nr. 846, VDI–Verlag, Düsseldorf, 1990.

→ Willan A.R., D.G. Watts, Meaningful Multicollinearity Measures, Technometrics, vol. 20, No. 4, Nov. 1978, pp. 407–412.

* * * , NTIS Foreign Technology Series, US Department of Commerce, vol. PB82, Nr. 9707, 1982: 'REGPAC: A Statistical Regression Package.

| | | | | | | | |
|---|---|---|---|---|---|---|---|
| $j_1$ | $s_{1,j_1}$ | $s_{2,j_1}$ | $s_{3,j_1}$ | ... | $s_{1,j_1}$ | ... | $s_{y,j_1}$ |
| | $s_{1,j_1}$ | $s_{2,j_1}$ | $s_{3,j_1}$ | ... | 1 | ... | $s_{y,j_1}$ |
| $j_2$ | $s_{1,j_2}^{j_1}$ | $s_{2,j_2}^{j_1}$ | $s_{3,j_2}^{j_1}$ | ... | ... | ... | $s_{y,j_2}^{j_1}$ |
| | $s_{1,j_2}^{j_1}$ | $s_{2,j_2}^{j_1}$ | $s_{3,j_2}^{j_1}$ | ... | ... | ... | $s_{y,j_2}^{j_1}$ |
| ... | ... | ... | ... | ... | ... | ... | ... |
| $j_p$ | $s_{1,j_p}^{j_{p-1}...j_2 j_1}$ | $s_{2,j_p}^{j_{p-1}...j_2 j_1}$ | $s_{3,j_p}^{j_{p-1}...j_2 j_1}$ | ... | ... | ... | $s_{y,j_p}^{j_{p-1}...j_2}$ |
| | $s_{1,j_p}^{j_{p-1}...j_2 j_1}$ | $s_{2,j_p}^{j_{p-1}...j_2 j_1}$ | $s_{3,j_p}^{j_{p-1}...j_2 j_1}$ | ... | ... | ... | $s_{y,j_p}^{j_{p-1}...j_2}$ |
| $j_1$ | $s_{1,j_1}$ | $s_{2,j_1}$ | $s_{3,j_1}$ | ... | $s_{1,j_1}$ | ... | $s_{y,j_1}$ |
| | $s_{1,j_1}$ | $s_{2,j_1}$ | $s_{3,j_1}$ | ... | 1 | ... | $s_{y,j_1}$ |
| $j_3$ | $s_{1,j_3}^{j_1}$ | $s_{2,j_3}^{j_1}$ | $s_{3,j_3}^{j_1}$ | ... | ... | ... | $s_{y,j_3}^{j_1}$ |
| | $s_{1,j_3}^{j_1}$ | $s_{2,j_3}^{j_1}$ | $s_{3,j_3}^{j_1}$ | ... | ... | ... | $s_{y,j_3}^{j_1}$ |
| ... | ... | ... | ... | ... | ... | ... | ... |
| $j_p$ | $s_{1,j_p}^{j_{p-1}...j_3 j_1}$ | $s_{2,j_p}^{j_{p-1}...j_3 j_1}$ | $s_{3,j_p}^{j_{p-1}...j_3 j_1}$ | ... | ... | ... | $s_{y,j_p}^{j_{p-1}...j_3}$ |
| | $s_{1,j_p}^{j_{p-1}...j_3 j_1}$ | $s_{2,j_p}^{j_{p-1}...j_3 j_1}$ | $s_{3,j_p}^{j_{p-1}...j_3 j_1}$ | ... | ... | ... | $s_{y,j_p}^{j_{p-1}...j_3}$ |
| ... | ... | ... | ... | ... | ... | ... | ... |

FIG. 7

METHOD AND DEVICE FOR SIGNAL ANALYSIS, PROCESS IDENTIFICATION AND MONITORING OF A TECHNICAL PROCESS

RELATED APPLICATION

This application is a continuation-in-part application which claims priority from International Application No. PCT/EP 9303674; filed Dec. 23, 1993 which claims priority from German Patent Application No. P 42 43 882.9, filed Dec. 23, 1992.

FIELD OF THE INVENTION

The invention relates to the field of signal analysis and more particularly to the field of failure diagnosis.

BACKGROUND OF THE INVENTION

Technical Field

In signal analysis, a signal to be analyzed y(t) is developed in an (finite) time-function sequence (for example, Fourier transform), or expressed as a linear combination of various measured or predetermined excitation or supplementary functions (for example, autoregressive modeling, multiple regression).

$$y(t) = \vec{B}(\vec{p}) \cdot \vec{x}(t) + \epsilon \quad (1)$$

y(t)=dependent variable (the time signal to be analyzed)

$\vec{x}$ (t)=vector of independent variables, regressors (dimension N)

$\vec{B}$ ($\vec{p}$)=coefficient vector (dimension N)

$\vec{p}$ =parameter vector (dimension M)

$\epsilon$=error

The parameter vector $\vec{p}$ describes the "operational" influences (for example, the rotary-frequency part of a bearing block vibration of a turbine depends on the active power).

The goal of signal analysis 1 is a complete, as ever possible, description of the time dependence of y(t) under certain operating conditions. The operating dependencies of the coefficients $\vec{B}$ are not considered, for the most part, in signal analysis.

In many technical fields, the dynamic behavior of a system or a process is described by S equations of the type (1):

$$\vec{y}(t) = A(\vec{p}) \cdot \vec{x}(t) + \vec{\epsilon} \quad (2)$$

Where:

$\vec{x}$ (t)=excitation or input vector (dimension N) regressors $\vec{y}$ (t)=vector of dependent output signal (dimension S)

A($\vec{p}$)=system matrix (dimension N * S)

Such problems are found in chemistry, control technology, modal analysis, etc. The equations of type 2 come from theoretical considerations. Comparison with practice leads to corrections in the elements of the system matrix, since, for example, manufacturing-related tolerances lead to deviations from the value theoretically expected.

The coefficients in equations 1 or 2 are calculated by means of the least squares method from data found experimentally. A special case in the application of the least squares method is the Fourier transform, since here the independent functions in equation 1 are orthogonal to one another. The orthogonality of the independent functions allowed the development of a simple method for calculating the discrete Fourier transform by means of special FFT coprocessors. No processors were developed for the general case of nonorthogonal functions—for example, multiple regression, autoregressive modelling, because of the existing numeric and, not least of all, methodical difficulties.

One of the main applications for equations 1 and 2 is system or process monitoring for the purpose of early detection of failure. Here, either deviations from the measured output signals of the model forecast or changes in the model coefficients in equations 1 or 2 are used as early indicators of failure.

The State of the Art

The monitoring task of a technical process contains a series of subtasks:

1. signal analysis, signal validation
2. system/process identification (with learning of the model via various operating states) to respond to
   a. operating or stochastic disturbances (for example, through control)
   b. abnormalities in the process routine/system behavior (diagnosis, failure diagnosis).

The mathematical treatment of every subtask can be attributed to form equations 1 or 2. Therefore, the state of the art will be explained using the system and process identification of monitoring vibrations.

Standard monitoring of the vibration of rotating components (for example pump or turbine shaft) is limited to monitoring the effective or peak value of a vibration signal.

Much more refined vibration information is obtained from frequency-selective methods, where usually the amplitude, frequency value and/or phase value (called monitoring function y hereafter) for a deterministic or stochastic system residence are monitored.

The problem that occurs in this type of monitoring is the strong dependence of this monitoring function on the respective load state of the machine. The relative positions of the machine components also influence the stiffness and damping coefficients of the mechanical structure considered (especially the shaft-bearing block distance on plain bearing-mounted shafts).

To come to terms with this state of affairs, many attempts were made to describe the behavior of the monitoring functions y phenomenologically using the existing operating parameter $\vec{x}$ (for example, real power and reactive power in the case of a turbine).

The usual way is to introduce classes into the operating parameter space. For each class and system resonance monitored, statistical characteristic values are found for the monitoring function and these characteristic values are used to check whether the monitoring variables exceed permitted limits for a specific class.

The disadvantage of this method is the number of classes which grows quickly with the number of parameters and the number of areas chosen for one parameter. Since the limits are also class-specific, this quickly leads to great complexity, even for vibration experts.

An analytical solution is offered by the use of multiple regression in determining the monitoring functions y as a function of the measured parameter $\vec{x}$, hereafter designated regressors.

But past attempts failed, on one hand due to the incomplete description of the process and, on the other, due to the instability of multiple regression in the form in which it was used until now (See Unexamined Patent Application, Germany 37 25 123 A1; Computer-aided Vibration-Diagnostic Monitoring of Sets of Power Station Turbines, M. Weigel, J. Boetius, *VDI Reports*, No. 846, 1990.). Because of the great expense for identification and computing, the number of parameter variables used in the model is small and the model structure depends very much on the experience of the specialist (See S. Drobniak, W. Eisner, The Multiregression Identification Algorithm for the Condition Monitoring of Turbomachinery, *8th International IMEKO Symposium on Technical Diagnostics*, Sep. 23–25, 1992, Dresden, pp. 319–328.).

The incomplete description is not understood as a lack of important parameters (these can be measured at any time), but as not considering many parameter values or combinations. The random sample that is used for learning the regression coefficients cannot contain all the parameter values or combinations that come up in operation (See S. Drobniak, W. Eisner, The Multiregression Identification Algorithm for the Condition Monitoring of Turbomachinery, *8th International IMEKO Symposium on Technical Diagnostics*, Sep. 23–25, 1992, Dresden, pp. 319–328.), and later, under certain circumstances, major systematic errors arise.

Hence the need for a learning system for process modeling. The control circuits (See M. Seitz, A. Kunz, H. Tolle, Learning Control of Idle Time Processes, *Automatisierungstechnik* 41, Vol. 9, pp. 323–331, 1993.) known in the literature have the advantage of modeling any nonlinear connections by simple tabular data filing. This takes a lot of memory, and the form of the model is not parametric. But to get better failure diagnosis, if necessary, a parametric form is required.

The linear approach also contributes to the incomplete description. But here technical dependencies are nonlinear, i.e., higher orders of a Taylor series development or other nonlinear functional dependencies (for example: the product of two regressors) must be considered.

Redundancy, i.e., the use of regressors equivalent in themselves in describing functional parameter dependence (equation 1) of a monitoring variable, also contributes to the instability of this method. Multiple regression then gives false coefficients, which lead to barely reproducible estimated values outside the sample used for determining the coefficients. This instability is known in the literature as multicollinearity, and often as degeneration (See M. A. Efroymson, Multiple Regression Analysis, Chapter 17 in A. Ralston, H. S. Wilfl, Ed., *Mathematical Methods for Digital Computers*, R. Oldenbourg Verlag 1967, pp. 345–362.) and is the main reason that the use of multiple regression for vibration monitoring (and for monitoring in general) was almost impossible. In order to get rid of redundancy, various methods were developed for selecting the model variables $\vec{x}$ (regressors) (See R. R. Hocking, The Analysis and Selection of Variables in Linear Regression, *Biometrics* 32, pp. 1–49, March 1976.). They all have the disadvantage that numerical instabilities occur in the event of a large number of regressors.

And with stepwise regression, which are often cited in the literature on multiple regression and have the advantage of the choice of significant parameter functions, no systematic checking of multicollinearity is done. As stated many times in the literature (See Tolerance and Condition in Regression Computations, Kenneth N. Berk, *Journal of the American Statistical Association*, December 1977, Vol. 72, No. 360, pp. 863–866, and A Note on Checking Tolerance in Matrix Inversion and Regression, James W. Frane, *Technometrics*, Vol. 19, No. 4, November 1977, pp. 513–514.), the test of multicollinearity is actually only a test of numerical stability for a matrix inversion, but does not consider the statistical properties of the data. Nor are the known effects of multicollinearity (See G. M. Mullet, Why Regression Coefficients Have the Wrong Sign, *Journal of Quality Technology*, Vol. 8, No. 3, pp. 121–126, July 1976, and G. E. P. Box, Use and Abuse of Regression, *Technometrics*, Vol. 8, No. 4, pp. 625–629, November 1966.)—a sign change or large value of a coefficient when putting a new regressor in the model—considered (See M. A. Efroymson, Multiple Regression Analysis, Chapter 17 in A. Ralston, H. S. Wilfl, Ed., *Mathematical Methods for Digital Computers*, R. Oldenbourg Verlag 1967, pp. 345–362.). The stochastic nature of the regressors $\vec{x}$ (1) are considered in the so-called models with errors in the variables (See H. Schneeweiß, H.-J. Mittag, Linear Models with Data Subject to Errors, *Physica Verlag*, Heidelberg/Vienna, 1986, and H. Bunke, O. Bunke, Eds., *Nonlinear Regression, Functional Relations and Robust Methods*, Vol. II, Chap. 3, John Wiley & Sons.). This approach is related to Ridge regression (for example, *Applied Regression Analysis*, N. R. Draper, H. Smith, John Wiley & Sons 1981, pp. 313–325), and leads to a consistent estimation of the regression coefficients. For larger N in equation 1, the last method is not suitable due to the computing expense and the numerical instability, or is suitable only conditionally for selection of the regressor variables.

In contrast, stepwise regression offers an inexpensive alternative due to short computing times. In any case, thus far, only one regression model has been obtained with this algorithm (M. A. Efroymson, Multiple Regression Analysis, Chapter 17 in A. Ralston, H. S. Wilfl, Ed., *Mathematical Methods for Digital Computers*, R. Oldenbourg Verlag 1967, pp. 345–362, and *Applied Regression Analysis*, N. R. Draper, H. Smith, John Wiley & Sons 1981, pp. 307–313). The model obtained in this way was only rarely comparable for large N with models that are obtained with other selection methods (R. R. Hocking, The Analysis and Selection of Variables in Linear Regression, *Biometrics* 32, pp. 1–49, March 1976, *Applied Regression Analysis*, N. R. Draper, H. Smith, John Wiley & Sons 1981, pp. 312–313).

The most important procedures used to calculate the multiple regressors are implemented in the different software packets (*Applied Regression Analysis*, N. R. Draper, H. Smith, John Wiley & Sons 1981, pp. 344–349, and *NTIS FOREIGN TECHNOLOGY SERIES*, US DEPARTMENT OF COMMERCE Bd. PB82, Nr. 9707, 1982; 'REGPAC: A STATISTICAL REGRESSION PACKAGE'). These are meant for the design of an interactive model and are not suitable for the technical monitoring process. Therefore, the experience of specialists is critical. The usual base criteria is a predetermined model size.

In *NTIS FOREIGN TECHNOLOGY SERIES*, US DEPARTMENT OF COMMERCE Bd. PB82, Nr. 9707, 1982; 'REGPAC: A STATISTICAL REGRESSION PACKAGE', a "rigorous selection of significant variables" is mentioned. A significance test, no matter how rigorous, will only prove whether the newly introduced variable is sufficient to explain the dependant variable. As mentioned above, the goal of a technical procedure is the determination of a stabile regression model. Therefore, the main criteria is the collinearity test (tolerance test (See M. A. Efroymson, Multiple Regression Analysis, Chapter 17 in A. Ralston, H.

S. Wilfl, Ed., *Mathematical Methods for Digital Computers*, R. Oldenbourg Verlag 1967, pp. 345–362.)) and not the significance test.

Briefly, it can be said that at the moment there is no procedure that can determine all collinearity free models, random sizes and take into consideration random (or user preset) linear and/or non-linear regressor functions as well as any changes to the regressor values, in an automatically replaceable manner for the modelling, monitoring, control and regulation processes.

SUMMARY OF THE INVENTION

Task of the Invention

The task of the invention is to avoid the instability of the estimated values (predictors) in the monitoring variable y in (1), without being limited to exclusively linear dependencies or to a small number of regressors $\vec{x}$ and additional parameters $\vec{p}$ in (1). Thus, in the signal analysis part, the regression coefficients should be calculated by Consistent, Expanded, Fast, Stepwise multiple Regression (CEFSR) using a recursive algorithm in order to make real-time applications possible.

With monitoring, control and regulation the problem of outliers is solved by the regression models of the regressors among themselves supplied by CEFSR, by not considering regressor values that lie outside the confidence interval obtained by statistical methods. This is considered a normal condition test and used to prevent false alarms caused by signal failures. With new ranges or combinations of parameters that come along, that have not yet been obtained, but are possible (normal status) due to the process dynamics and the background information, the covariance and correlation matrix as well as the "best" Q model updated (learning). Along with the random regressor functions, this leads to minimization of systematic estimating errors.

For the process-monitoring task, failure related changes in the system or process should be recognized first and foremost by this. This happens, on one hand, through the development over time of residues compared to the reference model, and on the other hand, through continual process identification (control model formation) with CEFSR, through the development over time of the regression coefficients or model changes.

Advantageous Effects of the Invention

The CEFSR method in the invention has the advantage of long-term stable prediction values for the monitoring variable y in equation 1, i.e., a process model for this variable has been found that can stand up physically.

Implementation of the method in a processor will lead to a clear improvement in signal analysis (as with FFT processors). By being able to predetermine any nonorthogonal functions here (which must in some way have something to do with the process studied), the model order can be substantially reduced. (FFT typically 1024 components). For a variable y, several redundant and simple analytical process models with typically 2 to 12 components are obtained. With them, the various influencing factors that describe the process behavior at a certain place (for example, in a certain bearing) on the machine being monitored (system) can be separated, and their importance to the process better judged.

This method can also greatly speed up signal analysis, if the problem of quickly calculating the correlation matrix is solved by means of faster processors. For a process-monitoring system, this problem is eased, since here the covariance matrix is updated only for new values of the regressors or combination of regressors, i.e., only a few multiplications are necessary for learning as well as for control model formation.

A significant signal analysis method called the "autoregressive modeling" method is mentioned that can be written in the form equation 1. It has the advantage over FFT that it works with a small set of data. Short-term changes in the signal can thus be better tracked. With the method presented here, criteria are given whereby some of the past steps of the same or another signal used in the model are selected. The model order depends only on the values used for the F test, and the use of noncollinear functions guarantees the stability of the model.

If a process model yields no Gauss-distributed residues (i.e., no good model), it can be determined very quickly whether the order of the nonlinear functions is too small or whether other parameters are simply missing that describe the process better. With it, complicated nonlinear polynomial dependencies and relaxation effects (for example, thermal equalization effects) can be described very easily.

Control of model formation, which runs parallel to self-learning, provides a series of diagnostic aids:

1. If there are deviations from the learned process model, the control model formation specifies whether new influencing factors should be added or have already changed their existing contribution to the model or are gone. With knowledge of the corresponding process and system structure, a higher degree of diagnostic reliability and depth are achieved.

2. Making a control model also covers a case in which opposite developments of contributions of two or more influencing factors leave the monitoring variable unchanged. In this way, failure-related changes can be recognized and evaluated, long before they are noticeable in the monitoring variables.

The choice of residues as monitoring variable enable the faster recognition of changes to the regression model of the current monitoring variable with the help of the long-term trend of the residues.

The advantageous effects of the invention will be explained using an example in which the vibrations of a machine, especially a machine with rotating components, are monitored. The precondition for measurement is the presence of enough vibration sensors. Their time signals are transformed according to the equation 1 using FFT in the spectral range.

The goal of the method is to model as precisely as possible the operating behavior of certain spectral components considered important for the monitoring. Additional measured variables—operating parameters—are needed for this, which describe the load state and the relative position of the components of the machine being monitored synchronously with the signal spectra. A new application of the equation 1 to the spectral coefficients (monitoring variable y) found previously, wherein this time the operating parameters represent the regressors, yields the experimentally derived model sought. The model coefficients are first detected by means of CEFSR.

The invention will be described in greater detail using the drawings. First the method of consistent, expanded, fast and stepwise multiple regression will be explained.

BRIEF DESCRIPTION OF THE DRAWINGS

This invention is pointed out with particularity in the appended claims. The above and further advantages of this invention may be better understood by referring to the following description taken in conjunction with the accompanying drawing, in which:

FIG. 7 shows a memory 113 and the layout for the rows of the new regressor to be introduced into the recursion level p.

DESCRIPTION OF THE PREFERRED EMBODIMENT

Consistent, Expanded, Fast and Stepwise Multiple Regression (CEFSR)

Theoretical Basis

In order to clarify the terms that now follow, a geometric representation of the variables in the sample area (for example, *Applied Regression Analysis*, N. R. Draper, H. Smith, John Wiley & Sons 1981, pp. 201 et seq.) will be chosen. The sample (with size L) of a dependent or independent variable represents an L-dimensional vector in this space. The correlation coefficient between two variables is thus the cosine of the angle between the two vectors in the sample space. The sample vector of the component i of the vector $\vec{x}$ in equation 1 is marked $X_i$. At the same time, the way that the method is carried out will be specified using the figures.

Multicollinearity a) Process Identification with Collinear Regressors

Figure 1:
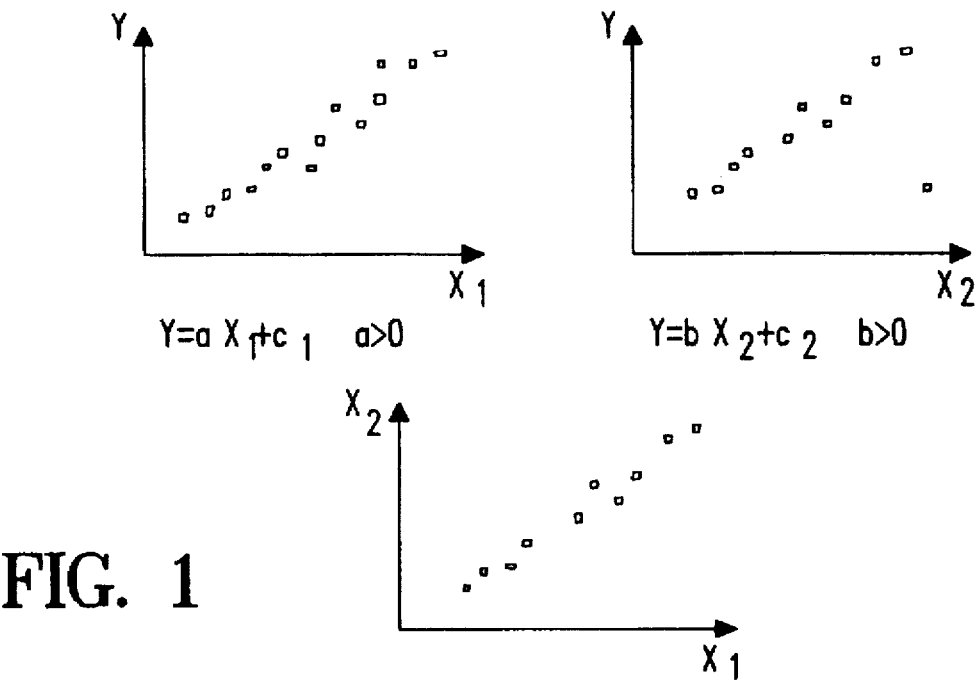
FIG. 1 shows a diagram of a dependent variable Y, once as a function of the regressor $X_1$, and once as a function of the regressor $X_2$. The collinearity of the two regressors is proven by the linear relation between them.
Figure 2:
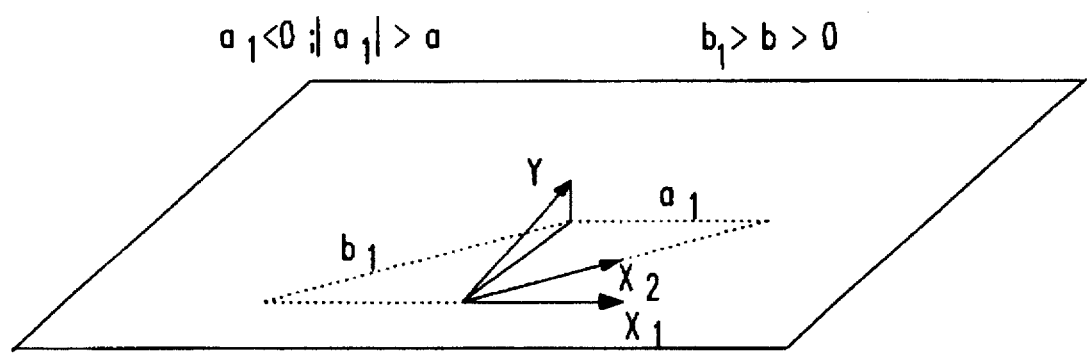
FIG. 2 shows the regression of the variable Y over $X_1$ and $X_2$, shown in the sample area as projection on the regression plane.

FIG. 1 shows the case of a dependent variable Y with two collinear regressions, $X_1$ and $X_2$. Models with only one regressor yield positive coefficients. As can be seen from the diagram of the sample area in FIG. 2, the sign of the variable $X_1$ changes, which is in contrast to the physical realities in FIG. 1. Since there are two equivalent variables, the two models with only one regressor are equivalent. Trying to put both regressors into the model leads to the wrong signs and values for the coefficients.

b) Process Identification with Error-in-the-Variables Collinear Regressors

Figure 3:
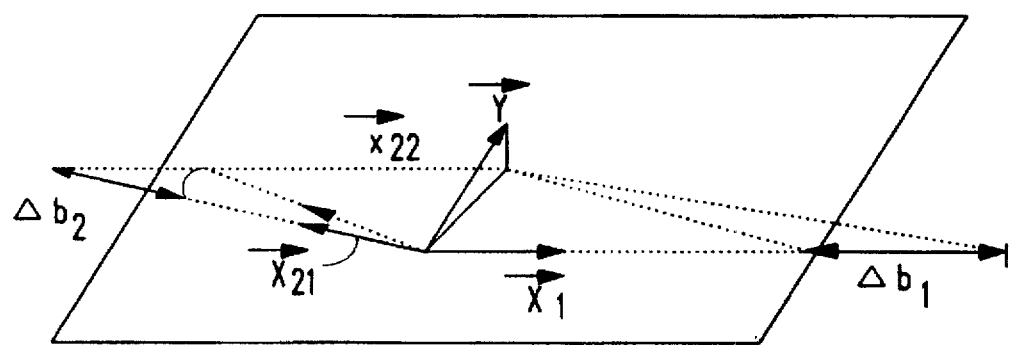
FIG. 3 shows the effect of a small change in direction in the vector $X_2$ on the regression coefficients of the variable Y.

The usual assumption in multiple regression is that only the dependent variable is subject to error ($\epsilon$ in equation 1). The expanded assumption that the independent variables are also subject to errors, (See H. Schneeweiß, H.-J. Mittag, Linear Models with Data Subject to Errors, *Physica Verlag*, Heidelberg/Vienna, 1986, and H. Bunke, O. Bunke, Eds., *Nonlinear Regression. Functional Relations and Robust Methods*, Vol. II, Chap. 3, John Wiley & Sons) can be illustrated through the variation in the angle between two parameter vectors. FIG. 3 shows two samples, where it is assumed that $\vec{X}_1$ has the same alignment, while $\vec{X}_2$ has two different alignments relative to $\vec{X}_1$: $\vec{X}_{21}$ and $\vec{X}_{22}$. For model identification, this means that the coefficients experience large variations $\Delta b_1$ and $\Delta b_2$, if the directions of two collinear regressors are subject to slight fluctuations due to measurement error from one sample to another.

c) Model with Error-in-the-Variables, Collinear Regressors: Prediction Error

Figure 4:
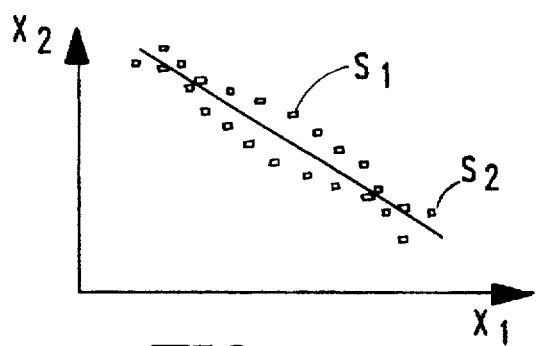
FIG. 4 shows two samples with the same correlation coefficient between $X_1$ and $X_2$.
Figure 5:
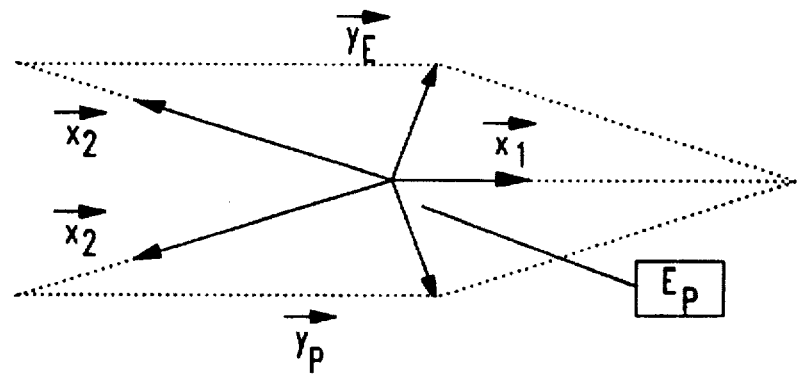
FIG. 5 shows a model and prediction for the samples given in FIG. 4.

FIG. 4 shows $\vec{X}_2$ as a function of $\vec{X}_1$ for two samples with the same correlation between the two variables (same cosine in sample area). The model was learned via the sample S, which corresponds to the configuration $\vec{X}_1$ with $\vec{X}_2$ and $\vec{y}_E$ in FIG. 5. The sample $S_2$ in FIG. 4 corresponds in FIG. 5 to the configuration $\vec{X}_1$ with $X'_2$ and the prediction $\vec{y}_P$. The error made there was marked $\vec{E}_P$.

The greater the stochastic errors of a regressor, the more difficult it is to avoid the above-mentioned effects b) and c). Therefore, the error in the regressors must be considered in the definition of multicollinearity. Thus, two regressors are collinear, if their vectors in the sample area (for samples of the same length), because of stochastic error, define no stable hyperplane.

For pairs of regressors with the same variance in direction in the sample area, the collinearity is thus smaller if the average angle between the regressors is larger. If average angle is the constant, the collinearity increases as the directional variance of the regressors involved increases. The definition known in the literature, whereby there must be a linear relation between the collinear regressors (4), applies only to (almost) perfect regressors (without errors).

Collinearity Cone

Figure 6:
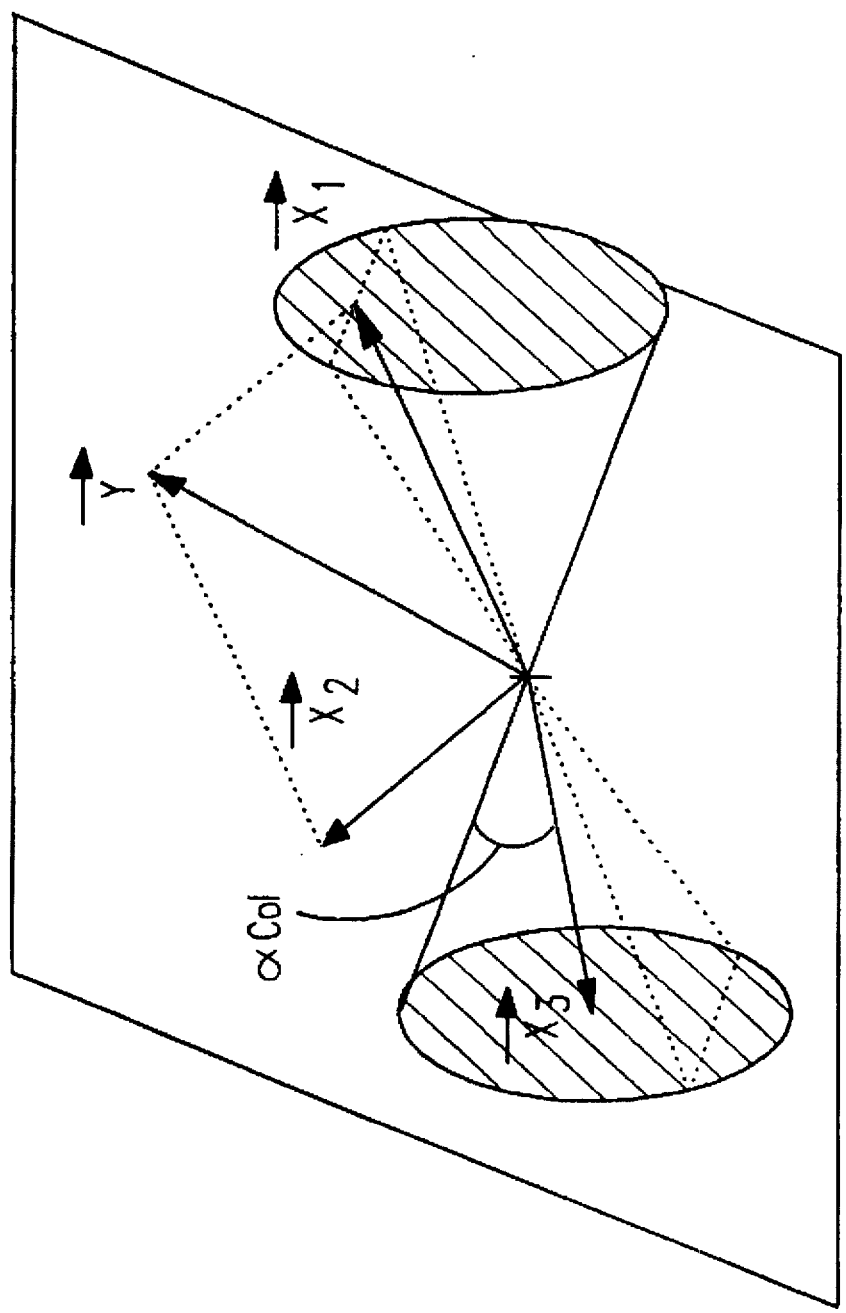
FIG. 6 shows the collinearity cone and selection of equivalent regression models.

If the average direction of a regressor variable in the sample area and its variance are known, a cone can be defined in this space around the vector involved, with the angle $\alpha_{Col}$ (FIG. 6 for $\vec{X}_3$). As soon as this regressor is considered in the model, no other regressor whose direction is within the collinearity cone can be taken into the regression model: in FIG. 6, for example, the regressor $\vec{X}_1$ can no longer be accepted, since it would form an unstable model with $\vec{X}_3$. It should be expressly pointed out that the tolerance test in M. A. Efroymson, Multiple Regression Analysis, Chapter 17 in A. Ralston, H. S. Wilfl, Ed., *Mathematical Methods for Digital Computers*, R. Oldenbourg Verlag 1967, pp. 345–362 corresponds to an angle $\alpha_{Col}$ of max. 1.82 (degrees) M. A. Efroymson, Multiple Regression Analysis, Chapter 17 in A. Ralston, H. S. Wilfl, Ed., *Mathematical Methods for Digital Computers*, R. Oldenbourg Verlag 1967, pp. 345–362, Tolerance and Condition in Regression Computations, Kenneth N. Berk, *Journal of the American Statistical Association*, December 1977, Vol. 72, No. 360, pp. 863–866, and A Note on Checking Tolerance in Matrix Inversion and Regression, James W. Frane, *Technometrics*, Vol. 19, No. 4, November 1977, pp. 513–514. For most applications, this value is completely unusable.

Selecting Equivalent Models

Since in FIG. 6 the regressors $\vec{X}_1$ and $\vec{X}_2$ lie in the same plane in the sample area as the dependent variable $\vec{Y}$, they are the ideal solution for the problem posed. Stepwise regression, in contrast, starts with the regressor that has the best correlation with the dependent variable, and in this case that would be $\vec{X}_3$. Based on the collinearity cone, the regressor $\vec{X}_1$ is never used in the model, and the "best" model is therefore not found. But as soon as all regressors that lie in the collinearity cone are regarded as equivalent starting variables and are tested in sequence, the "best" model is also found. Thus, the main disadvantage of stepwise regression (only a model and not necessarily the "best") is eliminated. Through the selection method described, a recursive form of model calculation is offered.

Fast Matrix Calculation

Following the method in M. A. Efroymson, Multiple Regression Analysis, Chapter 17 in A. Ralston, H. S. Wilfl, Ed., *Mathematical Methods for Digital Computers*, R. Oldenbourg Verlag 1967, pp. 345–362, all variables are centered on their mean value. Thus, the matrix S specified there (correlation matrix, memory 123 in FIG. 8) contains only correlation coefficients in pairs in the nondiagonal elements. The diagonal elements represent the lengths of the unit vectors in the sample area. With a dependent variable and N regressors, the matrix S has the dimension (N+1)*(N+1).

Stepwise regression is actually nothing but the Gauss method for inversion of a matrix, wherein a certain sequence of pivot elements is given according to the method given below. Thus, M. A. Efroymson, Multiple Regression Analysis, Chapter 17 in A. Ralston, H. S. Wilfl, Ed., *Mathematical Methods for Digital Computers*, R. Oldenbourg Verlag 1967, pp. 345–362 only the elements in the dependent variable column (for the F test and for calculating the regression coefficients), hereafter designated dependent column, and the diagonal elements (for the collinearity test) are needed. This gives a memory requirement of 2N+1 values in the memory 111 in FIG. 8 for a recursion level p.

In the recursion level p, the regressor $X_{j_p}$ is chosen. The matrix elements of the memory 111 in FIG. 8 in the recursion level p have the form (k=1,2, ... N) after this regressor is used:

$$S_{kk}^{j_p j_{p-1} \cdots j_1 j_1} = S_{kk}^{j_{p-1} \cdots j_1 j_1} - S_{k j_p}^{j_{p-1} \cdots j_1 j_1} \times S_{k j_p}^{j_{p-1} \cdots j_1 j_1} \quad (3)$$

$$S_{ky}^{j_p j_{p-1} \cdots j_1 j_1} = S_{ky}^{j_{p-1} \cdots j_1 j_1} - S_{k j_p}^{j_{p-1} \cdots j_1 j_1} \times S_{y j_p}^{j_{p-1} \cdots j_1 j_1} \quad (4)$$

The upper indices give the numbers of the regressors that were already used in the model. $S_{kj_p}^{j_{p-1} \cdots j_1 j_1}$ stands for the matrix elements with the same indices, but normed to $S_{j_p j_p}^{j_{p-1} \cdots j_1 j_1}$. The matrix elements to the right of the equal sign were calculated in the recursion level p–1, memory 111, FIG. 8. The matrix elements $S_{kj_p}^{j_{p-1} \cdots j_1 j_1}$ of the current recursion level p are calculated from the previous rows in the matrix A in FIG. 7 (memory 113 in FIG. 8), where the element $S_{j_p j_p}^{j_{p-1} \cdots j_1 j_1}$ in memories 111 and 113 for the so-called recursion matrix is replaced with its reciprocal value:

$$S_{kj_p}^{j_{p-1} \cdots j_1 j_1} = S_{kj_p} - \Sigma A(2 \times i - 1, k) \times A(2 \times i, j_p) \quad (5)$$

The row index i in equation 5 takes the values of 1 to p–1. $S_{kj_p}$ is one element of the correlation matrix S in memory 123 in FIG. 8. As soon as a regressor is taken out of the model, because its contribution has become negligible, the recursion matrix A in FIG. 7 (memory 113 in FIG. 8) must be recalculated. As can be seen from FIG. 7, here the variable $j_2$ was taken out of the model, so that for the recursion level p in equation 5, the variable i takes the values from 1 to p–2, with an offset of 2*p, which is now filed in the offset memory 112 at the recursion level p.

With 100 regressors N=100 and 7 recursion levels considered, the computing effort (multiplications) is reduced by around 90%, compared with the usual methods, considering the symmetry of the correlation matrix S.

Consistent Estimation

During the model identification, the diagonal elements of the variables that were not yet used in the model, represent the square of the length of the residual vectors of the respective variables (distance from the tip of the original unit vector to the actual regression space). This diagonal element may not remain under the value $\sin^2(\alpha_{Col})$, if the accompanying regressor is to be used in the model. Thus, the problem of estimating the collinearity angle $\alpha_{Col}$ arises, and in connection with it, the problem of consistent estimation as well.

Figure 8:
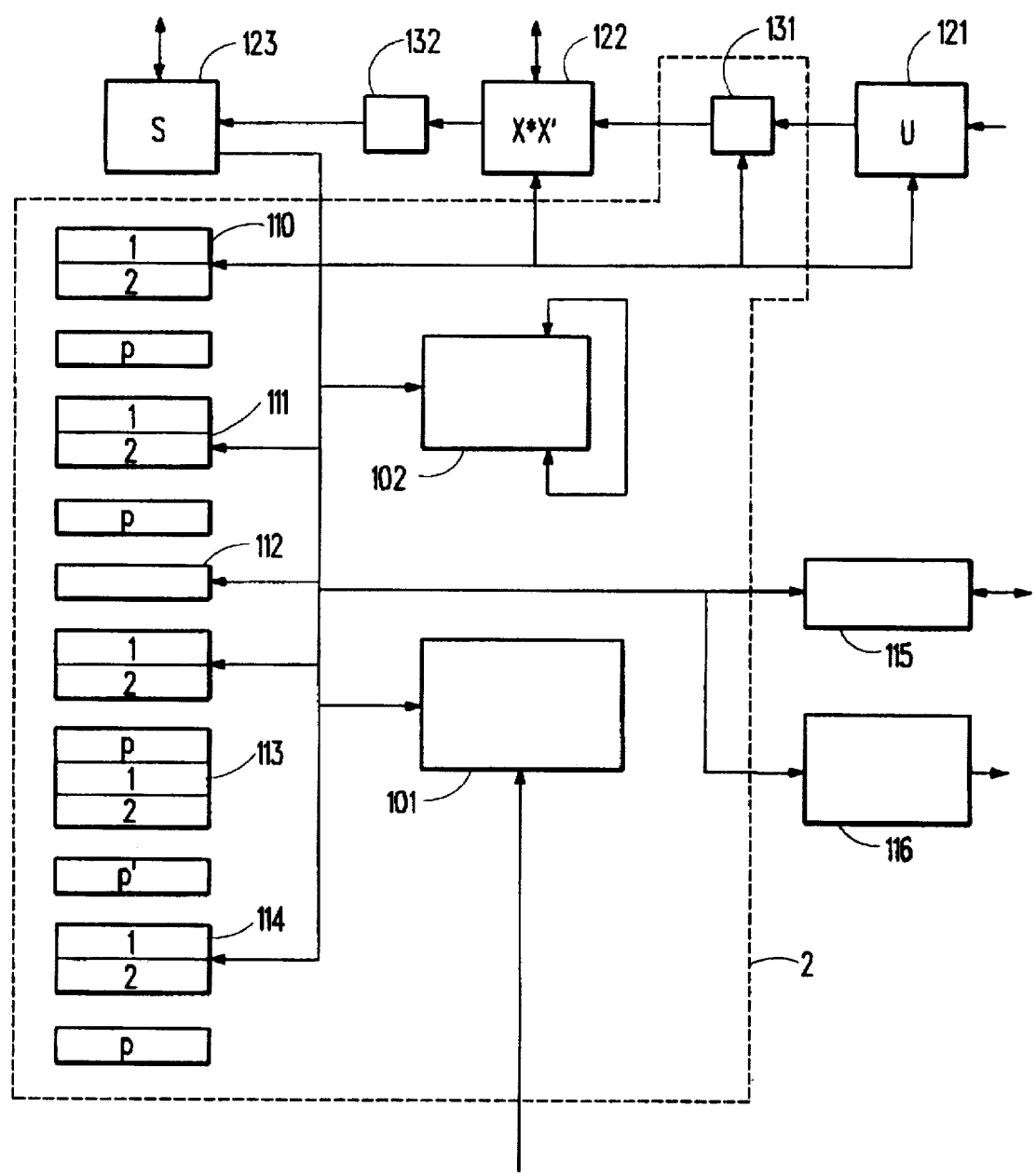
FIG. 8 shows a diagram of a circuit arrangement for calculating the fast, expanded, stepwise regression in recursive form.

If the realistic assumption of a regressor subject to error $X_{jp}$ is made:

$$X_{jp} = \xi_{jp} + \delta_{jp}$$

with $\xi_{jp}$ as the true value of the regressor $j_p$ and $\delta_{jp}$ as the accompanying error, as well as the usual assumptions of error independence in the literature, one obtains for the diagonal element $S_{j_p j_p}$ in 123 FIG. 8 a correction term that is equal to the normalized variance of the regressor $j_p$. Thus, one obtains a Ridge regression with row-specific correction terms of the diagonal elements. Under the additional assumption of isotropy of the error in the sample space, the collinearity angle for the regressor in question can thus also be given as:

$$\sin^2(\alpha_{Col}) = q \times \sigma^2_{jp} \quad (6)$$

where q>=3 and $\sigma^2_{jp}$ represented the normed variance of the regressor $j_p$.

The variance of the individual regressors can be estimated from the existing data material by using multiple regression introduced on the individual regressors as a dependent variable, under the simplified assumption that the remaining regressors are error free. If there exist collinearity between the regressors, a regression model can be found and the resulting residues give an estimate of the variance $\sigma^2_{jp}$.

Expanded Stepwise Regression

Using M. A. Efroymson, Multiple Regression Analysis, Chapter 17 in A. Ralston, H. S. Wilfl, Ed., *Mathematical Methods for Digital Computers*, R. Oldenbourg Verlag 1967, pp. 345–362, the procedure can now be given for expanded stepwise regression that is implemented in the regression unit 102, FIG. 8. Control of data transfer and control of routines is handled by the control unit 101. The expansions for M. A. Efroymson, Multiple Regression Analysis, Chapter 17 in A. Ralston, H. S. Wilfl, Ed., *Mathematical Methods for Digital Computers*, R. Oldenbourg Verlag 1967, pp. 345–362 are given in italics. This is a recursive method and the steps given here refer to recursion level p.

1) First the regressors are removed from the model, whose contribution in reducing the variance of the dependent variable has become negligible in the presence of new regressors. These regressors are locked for the subsequent recursion levels. Besides saving computing time, this prevents them from being taken back into the regression model. The offset memory 112 is updated for the recursion level p. The row p in memory 110 locking mask matrix is also updated and the rows u+1 to u+2p' (u=offset, p'=new model order) in memory 113 are recalculated according to equation 5 and filed in memory 113. Rows p–1 in 111 must also be recalculated for the diagonal elements and the dependent column, but without using row p–2 in the same memory.

2) the model order and regressor numbers are filed in memory 114.

3) regressors whose direction in the sample space form an angle with the regression space that is smaller than $\alpha_{col}$ are locked for the current regression level and the one under it (row p in memory 110). This saves computing time. The row p in memory 110 is updated.

4) the remaining regressors are given an F test, to find the regressors that reduce the variance of the dependent variable significantly.

5) if no significant regressor was found in addition to that described in equation 6, the search is aborted, and the residue variance (See M. A. Efroymson, Multiple Regression Analysis, Chapter 17 in A. Ralston, H. S. Wilfl, Ed., *Mathematical Methods for Digital Computers*, R. Oldenbourg Verlag 1967, pp. 345–362 of the dependent variable that was achieved thus far is used for classification of the model found between the first Q "best" models. The residual variances of the models found thus far filed in memory 116 are compared with the residual variance of the current model, and if it belongs to the best Q model (in other words, if the current residue variance under Q is the smallest), the residual variance and the model coefficients with regressor numbers are filed in memory 116. After that, the system goes back to the next higher recursion level. In this way, the context of the recursion level p–1 is loaded from memories 110 to 114.

6) variable $\vec{X}_{jM}$, which would cause the biggest reduction in variance in the regression model, is selected from the remaining regressor variables, 7) all remaining regressor variables whose angle with $\vec{X}_{JM}$ lies within the collinearity cone of this variable, are selected as equivalent variables. For this, the residual variance of the regressors selected, which has already been calculated or preset, is read from memory 115 and the collinearity angle is calculated from it. The equivalent variables are used in order in the model, while the other equivalent variables are locked for the next recursion level (row p in memory 110 is updated). Here, a) the diagonal elements of the dependent column or the regression matrix with the newly selected regressor is calculated, and it is first checked:

whether the new regressor causes a sign change of a regression coefficient (effect a). If it does, this selection is thrown out and locked in 110 and the next equivalent regressor is selected and cleared in 110; go on with a).

otherwise the next lower recursion level is selected. When coming back from this level, go to a) with the corresponding changes in 110.

8) If all equivalent regressors of the actual recursion level were tested, the system goes back to the next highest recursion level. The context of the recursion level p–1 is loaded from the memories 110 to 114.

Guideline for Model

The regression module or processor has a data input matrix U (121, FIG. 8) with L rows for the L input channels, including the signal to be monitored. Each row has V values (sample length). For the sake of better modeling, there are various nonlinear functions for the function generator (131, FIG. 8) (higher powers, logarithms, cross products between the regressors, gradients, simple movements of the rows, etc.). In this way, additional rows are generated, so that an intermediate matrix X with N rows and V columns is created. The added functions can be given either by theoretical considerations on the signal (process) to be studied, or empirical for the purpose of identifying an empiric model. From this matrix X, the covariance matrix XX' is calculated from the correlation matrix determined in memory 123.

Vibration Monitoring System

After the principle for a long-term stable process model was created, one can now use the circuit layout in the invention described above in monitoring vibrations, or procedures for example. With the regression model of a spectral component obtained, one can now monitor both the deviations of the spectral components from the model and the changes in the coefficients of the model detected, for the purpose of early failure detection. The redundancy of the Q regression models is useful in the monitoring.

In order to explain the way in which the method in the invention works, the device in FIG. 9 will be explained using an application for early detection of failure by vibration monitoring.

Figure 9:
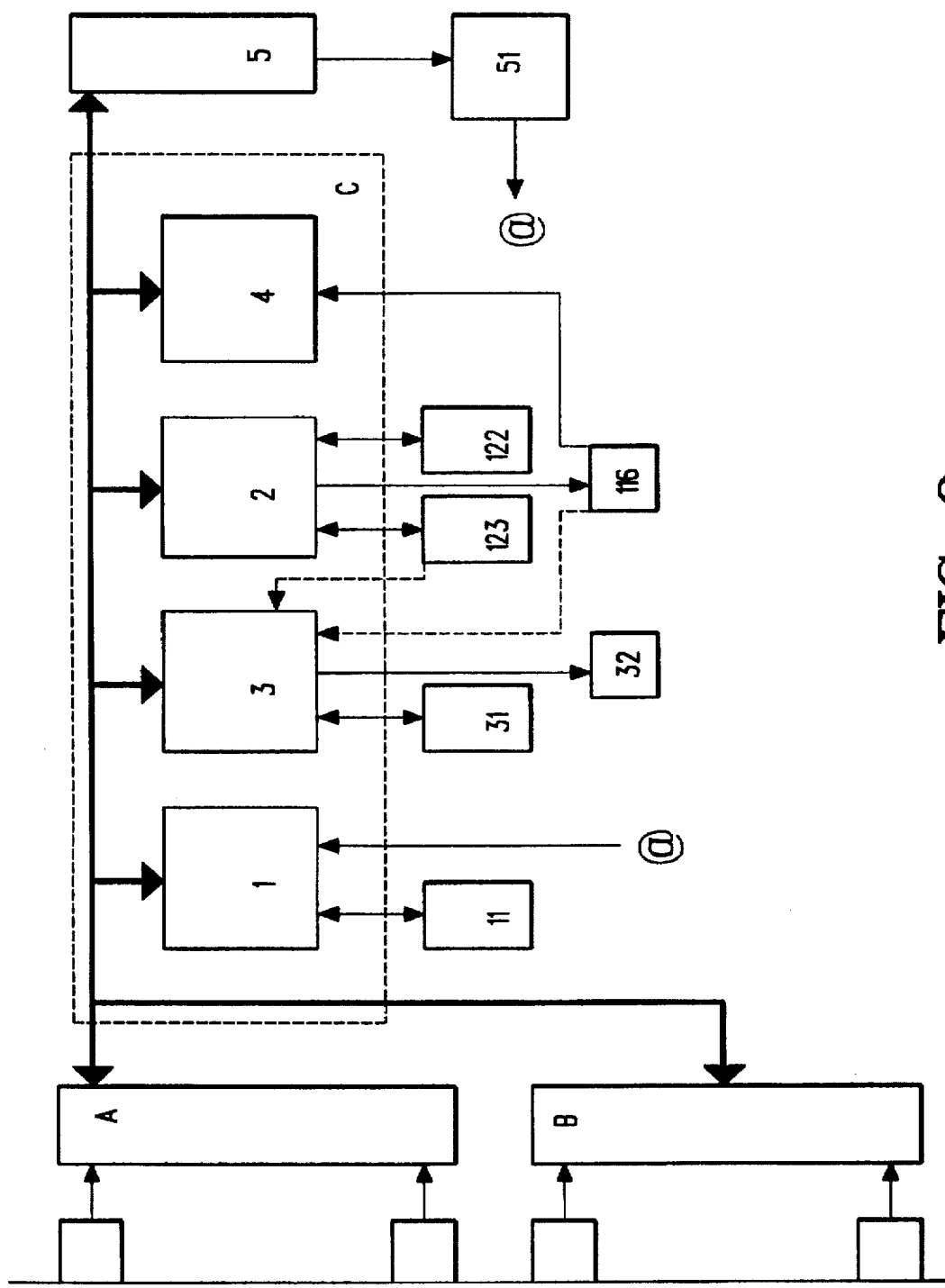
FIG. 9 shows a diagram of a device for vibration or process monitoring.

A commercial measurement data acquisition system (FIG. 9 A) provides the monitoring variables for the monitoring unit (FIG. 9 C). Another commercial process-acquisition system (FIG. 9 B) provides the monitoring unit (FIG. 9, C) with the monitoring variables with a certain selection of process parameters. In the case of a vibration-monitoring system, the signals recorded as process parameters are those that describe the load state of the system and the important relative positions of the system components (for example, in the case of a turbine, the relative shaft-bearing shell positions). For the monitoring variables, for example, vibration amplitudes at certain frequencies, for example, are recorded.

In the monitoring unit, the operating state of the system is first studied in the state-analysis module (FIG. 9, 1). With this and the data in the memory 11, FIG. 9, it is decided whether there is an operating state that is not yet sufficiently learned (in the statistical sense). If so, first the operating state control memory (FIG. 9, 11) is update, after which process identification is carried out by the regression unit described above (FIG. 9, 2 and/or FIG. 8.2). Here, the memory for the covariance matrix, the correlation matrix and the one for the regression coefficients and function numbers for the best Q model are updated (FIG. 9, 122, 123 and 116). This step is defined as "learning phase" and is used for full process identification and thus reduction of systematic errors. It is only started provided that no limits are exceeded in memory 51 for operating states already learned or other alarm criteria are met (FIG. 9, path @).

After the learning phase is complete, or if there is no new operating state, control process identification (FIG. 9, 3) is carried out. Here, the control values for the coefficients and the function numbers resulting from control are found, taking into account the values stored in 116, and filed in memory 32. The values in memory 32 (designed as a ring memory) can then be shown over time at any time and compared with the values in memory 116 for more refined early detection of failure.

As soon as the learning and/or control computation is over, the comparator unit (FIG. 9, 4) generates the estimated values of the signals to be monitored from the data in the memory 116. If there is failure that is noticeable in the frequency band being monitored, the estimated value will deviate more and more from the actual value over time. Therefore the difference between the actual value of the monitoring variable and the estimated value, called residue, is the monitoring function. The residue formed in the comparator is fed to an alarm device or a computer connected in series (FIG. 9, 5), where the limits that have been exceeded are recorded in memory 51 according to predetermined alarm criteria.

The computer displays the monitoring results and the diagnostic help.

The core of the monitoring unit (FIG. 9, C) is the regression unit (FIGS. 8 and 9.2) in which the process identification important for early detection of failure takes place. The control process identification (FIG. 9.3) is structurally the same as FIG. 9.2. In contrast to unit 2 in FIG. 9, in unit 3 in FIG. 9, the data in memory 116 is used, i.e., only the regressor functions that were found in the Q models are made available, in order to obtain comparable control values.

Having shown the preferred embodiment, those skilled in the art will realize many variations are possible which will still be within the scope and spirit of the claimed invention. Therefore, it is the intention to limit the invention only as indicated by the scope of the following claims.

I claim:

1. Device for carrying out consistent, expanded, fast and collinearity-free multiple regression in recursive form, for the purpose of the analysis or control of a technical process, comprising:

a processor (2) calculating the best Q regression models from data in a memory for the correlation matrix (123) which can be obtained via the unit for correlation calculation (132) from the memory (122) for the covariance matrix, and the memory for the regressor variances (115) entered or calculated beforehand, which are utilized for correction of the diagonal elements of the correlation matrix, and that the regression models are classified in terms of their residue variance by the regression unit (102) of the processor (2), which is bus-controlled by the control and addressing unit (101), the residual variance of the model, regressor numbers and coefficients being deposited in the memory (116) provided for that purpose, and that a locking memory (110), a memory for the diagonal elements and the dependent column of the regression matrix (111), a memory for the recursion matrix (113) with the offset-memory (112) belonging to the recursion matrix and a memory for the regression numbers (114) are provided for the realization of the recursive method, and that the regression unit (102) must perform several actions for the recursion level p, including that first of all those regressors are determined which make a small contribution to the model, and if necessary the regressors are locked (110), the offset for the recursion matrix is stored (112), the regressor rows of the new recursion matrix (113) and the new diagonal elements and the dependent column (111) are calculated, and the residual regressor numbers (114) stored, that those regressors, located within the collinearity cone of the current model, are determined and locked (110) with the help of the data from the memory for the regressor variances (115), that the most significant regressor from those remaining is searched, that regressor is selected which yields the model with the smallest residual variance and at the same time passes the F test known from statistics, and that, in the event of an unsuccessful search, the residual variance of the current model is utilized for the classification of this model between the best Qs, with the help of the residual variances of the models (116) already found, in which case, if the residual variance is smaller or equal to the largest stored residual variance, or currently less than Q models were found, the residual variance, the regression numbers and coefficients are stored in memory for the best models (116), and thereafter the regression unit (102) returns to the recursion level p−1, and its context is loaded from the corresponding memories (110 through 114), that, in the event of a successful search for a significant regressor, the group of regressors within the collinearity cone of the best regressor is found with the values of the regressor variances (115), that each of these regressors is incorporated into the model individually, one after the other, while the remaining ones from the collinear group remain locked (110), and with the precondition that none of the regression coefficients already found undergoes a sign change, the rows of the recursion matrix (113) for the new regressor and the new diagonal elements and the dependent column (111) are calculated and the recursion level p+1 selected, that, after processing of the collinear regressors, the change is made to the recursion level p−1, its context being loaded from the corresponding memories (110 through 114).

2. Circuit arrangement according to claim 1 wherein several regression units with associated memories operate in parallel.

3. Circuit arrangement according to claim 1 wherein several regression units with associated memory operate in parallel in several planes, the number of the regression units in the lower planes can increase.

4. Device according to claim 1, for monitoring a technical process or of oscillations of a machine or components of the same, especially machines with rotating parts, with the use of sensors for the measurement of monitoring variables, and of parameters which describe or influence the loading state and relative positions of the components of the monitored machine, and by modelling the parameter behavior of the monitoring variables by means of consistent, expanded, fast and collinearity-free multiple regression in recursive form, characterized by the fact that a measurement recording unit (A) is provided for the detection of the monitoring variables and a process capture system (B) for detection of the parameters, that a bus-controlled monitoring unit (C) is connected to the computer (5) along with the measurement recording unit (A) and the process detection system (B), that the monitoring unit (C) exhibits a control and state analysis unit (1), which, with the aid of the data in the operating-state control memory (11), has the following tasks:

a) Checking the operating state: in case of normal state, go to step b), otherwise it triggers an alarm and stores it in the alarm memory (51), b) if new, not yet learned operating states occur, it initiates formation of a new model in the regression unit (2), called a learning phase, if no alarms are present in the alarm memory (51), and then it updates the operating-state control memory (11), c) initiates the formation of a control model in the regression control unit (3), if an already learned operating state is present, that the new Q models are calculated according to the CEFSR process in the regression unit (2), and the coefficient and function-number memory (116) is updated, whereby the associated function generator (131) makes available a large number N, with N much larger than L, of additional, freely selectable, linear and nonlinear functions from the data of the L input channels, and the associated covariance matrix (122) and correlation matrix (123) memories are updated, that the formation of the control model is carried out according to the CEFSR method in the regression controller unit (3), employing the parameter functions from the coefficient and function number memory (116) determined in the regression unit (2), as well as the current measurement data, whereby a function generator (131) identical with that in the regression unit (2), is used for calculation of the values in the control-covariance matrix memory (31), and thereafter the model coefficients and function numbers obtained are stored in the ring memory (32) for the purpose of detecting trend developments in the Q models, that first of all the Q estimates of the monitor variables, or estimate of a process model obtained by utilization of the redundancy of the Q regression model, are calculated in the predictor and comparator unit (4), then the residues of the monitoring variables or the contributions of the individual parameters are formed and, with the fulfillment of various alarm criteria, such as threshold crossings, as well as model changes, alarm messages are formed, which are stored in the alarm memory (51) and employed for failure or process diagnosis, and that the computer (5) processes the visualization of the residues and model changes with the help of the data in the ring memory (32) as well as the processing or forwarding of the alarms present in the alarm memory (51).

5. Circuit arrangement according to claims 1, 2 or 3, characterized by the fact that, from the memory (121) of the input matrix U with L rows corresponding to the number of the input channels and V columns corresponding to the size of the sample, a number of additional, freely selectable, linear and nonlinear functions are made available as new repressors by the function generator (131), and thus a preliminary matrix X is generated with N rows, N being much larger than L, and the same column number, with which the covariance matrix XX' is calculated, and that the determined Q regression models, or a process model, obtained by utilizing the redundancy of the Q regression models, is employed for the control or analysis of a process.

6. Device according to claim 4, characterized by the fact that the residue of the monitoring variable is fed to an adjustment device, capable of changing one or more processing input values, for the purpose of regulating the process.

7. Device according to one of the claims 1, 2, 3 or 4, characterized by the fact that the performance characteristics of the circuit arrangements are realized on a computer or in parallel-computer architecture.

8. Method for the analysis or control of a technical process with the aid of regression models, which are calculated in recursive form by means of consistent, expanded, fast and collinearity-free multiple regression, in short CEFSR, for the variables relevant to the process, as a function of other parameters describing or influencing the process, termed regressors, characterized by the fact that a number of supplementary, freely selectable, linear and nonlinear functions of the regressors are calculated from the entry matrix U with L rows corresponding to the number of input channels and V columns corresponding to the size of the sample, and thus a preliminary matrix X is generated with N rows, with N much greater than L, and the same number of columns as U, which is used to calculate the covariance matrix XX', that the correlation matrix is calculated from the covariance matrix and the diagonal elements are corrected with the help of the individual regressor variances, that a regression model for the variable declared as dependent is calculated with the covariance matrix by means of a recursive method containing the following steps for one recursion level, that first of all, the regressors are determined, which make a small contribution to the model, in order to remove them from the model and lock them for the further recursion levels, in which case, if there are such regressors, the recursion matrix as well as the diagonal elements and the independent column of the regression matrix must be calculated anew for recursion level p, that the regressors located inside the collinearity cone of a regression space are locked, that the most significant regressor from the remaining ones is found by means of the F test, that, in the event of an unsuccessful search, the residual variance is used by the current model for the classification of this model between the best Qs, with the aid of the residual variances of the models already found, in which case, if the residual variance is smaller or equal to the largest stored residual variance, or at present fewer than Q models were found, the residual variance, the regressor numbers and coefficients are stored, and where, as the next step, the recursion level p−1 is selected, that, when the search is successful, the set of regressors is determined, which lie within the collinearity cone of the best regressor, that each of these regressors is incorporated into the model individually, in sequence, while the others, belonging to the collinear set, are locked and, with the precondition that none of the regression coefficients already determined has undergone a sign change, the rows of the recursion matrix for the new regressor and the diagonal elements and the independent column is calculated and the recursion level p+1 selected, that, after the processing of the collinear regressors, a change is made to recursion level p−1.

9. Method according to claim 8 for monitoring a technical process or the vibrations of a machine or structural parts of the same, especially a machine with rotating parts, with the use of sensors for the measurement of monitoring variables and of parameters describing or influencing the process, as well as of a measurement-data processing unit, which makes the values of the monitoring variables and of the parameters, called regressors, simultaneously available in digital form to a computer, characterized by the fact that an individual model formation is begun anew with the occurrence of new operating states for the respective monitoring variables after checking for a normal state and a checking for completeness in the regressor space, if no alarms are present, that, in the case of a new operating state, and updated covariance matrix, thus containing learning values, is formed from the current measurement values of the monitoring variables and the either linear or nonlinear parameter functions produced by the function generator, new regression models are determined according to CEFSR, that, in the case of an already learned operating state, a control model computation is carried out by means of the same method, in which case the significant parameter functions, already determined during the learning phase, are taken into account, that at least one estimate of the monitoring variables is derived from the parameter measurements with the coefficients or parameter functions determined, of one or more of the available Q regression models, or of a process model obtained by use of the redundancy of the Q regression models, and the at least one estimate is subtracted from the actual measured value of the monitored variable and that the resulting residues are taken into consideration as new monitoring variables, especially for alarm purposes and that new or leaving parameter functions or contribution changes of the old ones are used to form alarm messages and for failure or process diagnosis.

10. Method according to one of the claims 8 or 9, characterized by the fact, that the residue of the monitoring variable are passed to a adjustment device which can change one or more process input variables for the purpose of regulating the process.

* * * * *